US012442515B2

(12) United States Patent
Niggebaum et al.

(10) Patent No.: US 12,442,515 B2
(45) Date of Patent: Oct. 14, 2025

(54) LIGHTING DEVICE WITH EXPANDABLE FUNCTIONALITY

(71) Applicant: LEDVANCE GmbH, Garching bei Munchen (DE)

(72) Inventors: Alexander Niggebaum, Munich (DE); Krister Bergenek, Regensburg (DE)

(73) Assignee: LEDVANCE GmbH, Garching Bei Munchen (DE)

( * ) Notice: Subject to any disclaimer, the term of this patent is extended or adjusted under 35 U.S.C. 154(b) by 0 days.

(21) Appl. No.: 18/608,148

(22) Filed: Mar. 18, 2024

(65) Prior Publication Data

US 2024/0219004 A1 Jul. 4, 2024

Related U.S. Application Data

(63) Continuation of application No. 17/308,490, filed on May 5, 2021, now Pat. No. 11,933,478.

(30) Foreign Application Priority Data

May 5, 2020 (DE) ......................... 102020112139.3

(51) Int. Cl.

| | |
|---|---|
| ***F21V 15/01*** | (2006.01) |
| ***F21V 23/00*** | (2015.01) |
| ***F21V 23/04*** | (2006.01) |
| ***F21Y 103/00*** | (2016.01) |
| ***F21Y 115/10*** | (2016.01) |

(52) U.S. Cl.
CPC ............ *F21V 15/01* (2013.01); *F21V 23/003* (2013.01); *F21V 23/0435* (2013.01); *F21V 23/0442* (2013.01); *F21Y 2103/00* (2013.01); *F21Y 2115/10* (2016.08)

(58) Field of Classification Search
CPC .... F21V 15/01; F21V 23/003; F21V 23/0435; F21V 23/0442; F21V 17/002; F21V 23/045; F21V 15/02; F21V 17/10; F21Y 2103/00; F21Y 2115/10
See application file for complete search history.

(56) References Cited

U.S. PATENT DOCUMENTS

| | | | | |
|---|---|---|---|---|
| 4,750,095 | A | 6/1988 | Huang | |
| 5,413,223 | A | 5/1995 | Kang | |
| 7,581,844 | B1 | 9/2009 | Yang | |
| 8,646,937 | B2 | 2/2014 | Yang | |
| 9,109,792 | B2 * | 8/2015 | Yang | F21L 4/005 |
| 10,247,369 | B2 | 4/2019 | Bian | |
| 11,476,626 | B2 | 10/2022 | Chien | |
| 2006/0262525 | A1 | 11/2006 | Barbeau et al. | |
| 2007/0098391 | A1 | 5/2007 | Howard et al. | |
| 2008/0212319 | A1 | 9/2008 | Klipstein | |

(Continued)

*Primary Examiner* — Tsion Tumebo
(74) *Attorney, Agent, or Firm* — Hayes Soloway PC

(57) ABSTRACT

A main unit of a lighting device with expandable functionality. The main unit includes at least one light source, driver electronics, and a housing with an at least partially light-permeable housing wall. The main unit further includes a coupling element for forming a wireless coupling interface to an extension unit, wherein the coupling element is located within the housing and is designed such that the wireless coupling between the main unit and the extension unit through the partially light-permeable housing wall is carried out. Furthermore, an extension unit and a lighting device are provided.

22 Claims, 2 Drawing Sheets

(56) References Cited

U.S. PATENT DOCUMENTS

| | | | |
|---|---|---|---|
| 2009/0180280 | A1 | 7/2009 | Hadden |
| 2015/0049500 | A1 | 2/2015 | Sakarian et al. |
| 2016/0003428 | A1 | 1/2016 | Anderson et al. |
| 2016/0057838 | A1 | 2/2016 | Moros et al. |
| 2018/0249539 | A1 | 8/2018 | Saccavini et al. |
| 2018/0283839 | A1 | 10/2018 | Ruggeri |
| 2019/0011089 | A1 | 1/2019 | Whiting et al. |
| 2019/0261471 | A1 | 8/2019 | Wang et al. |
| 2020/0141545 | A1 | 5/2020 | Gielen et al. |
| 2021/0059123 | A1 | 3/2021 | Lys et al. |

* cited by examiner

LIGHTING DEVICE WITH EXPANDABLE FUNCTIONALITY

CROSS-REFERENCE TO RELATED APPLICATIONS AND PRIORITY

This patent application is a Continuation of U.S. patent application Ser. No. 17/308,490, filed on May 5, 2021, which claims priority from German Patent Application No. DE 102020112139.3, filed on May 5, 2020. Each of these patent applications is incorporated by reference herein in its entirety.

TECHNICAL FIELD

The present disclosure relates generally to lighting devices. More specifically, the present disclosure relates to lighting devices with expandable functionality.

BACKGROUND

Lighting devices are occasionally replaced with newer fixtures with enhanced functionality. In the process, the replaced lighting devices have to be disposed of, which can lead to high costs and a high environmental impact.

SUMMARY

One object of the embodiments of the present disclosure is to provide a lighting device that may be retrofitted in a simple, cost-effective and environmentally friendly manner.

To solve this object, according to a first aspect of the present disclosure, a main unit of a lighting device with expandable functionality is provided.

The main unit may include at least one light source (e.g., an LED light source), a driver electronics for driving the LED light source, and a housing for accommodating the at least one light source and the driver electronics, wherein the housing may have an at least partially, or at least regionally, light-permeable housing wall.

The main unit may further include a coupling element for forming a wireless coupling interface to an extension unit, as well as for functional extension of the main unit. The coupling element may be located inside the housing and may be designed in such a way that the wireless coupling between the main unit and the expansion unit may take place through the housing wall, in particular through the partially light-permeable housing wall.

Due to the wireless electrical coupling between the main unit and the extension unit through the housing wall, the main unit may be easily retrofitted with an extension unit without having to open the housing. Retrofitting the main unit in this way does not require qualified personnel with special knowledge or qualifications. Rather, the main unit may be retrofitted by the user as needed.

The main unit may be designed as a fully functional lighting device which is able to perform at least one basic function, such as lighting, even without the extension unit. In addition, the extension unit may be connected or removed during operation of the lighting device, since the housing of the main unit does not have to be opened when coupling with an extension unit.

The housing may be a hermetically sealed housing according to an IP (International Protection or Ingress Protection) degree of protection against the environment, for example to protect against an aggressive environment. Due to the wireless electrical coupling through the housing wall, the main unit may be retrofitted without loss of hermeticity of the housing.

By retrofitting the main unit with an extension unit designed as a control and/or sensor unit, the functionality of the main unit may thus be extended in a simple manner.

The coupling element may be designed to provide a spatially extended coupling area so that the wireless coupling interface between the main unit and the extension unit may be formed at different housing locations of the main unit, such as in the coupling area. Due to the spatial extension of the coupling area, the position of the extension unit within the coupling area may be freely selected. The free choice of the position or the coupling point of the extension unit may increase the assembly flexibility of the main unit. The position of the extension unit may be selected according to the specific application so that, for example, when the main unit is installed in a luminaire, the functionality of the main unit may not be significantly impaired. In addition, the choice of the position of the extension unit may ensure that the extension unit functions optimally.

The housing may be elongated, wherein the coupling area extends along the elongated housing. In some instances, the couple area may extend substantially over the entire length of the elongated housing. The extension unit may thus be slid back and forth along the housing as needed to achieve optimal performance of the main unit or the extension unit.

The coupling element may be substantially conformal to the housing wall at least in sections or areas. The coupling element may have such a spatial-physical design or three-dimensional shape that it may lie close to the inside of the housing wall. This allows the wireless coupling between the main unit and the extension unit to be strengthened.

The at least partially light-permeable housing wall may be in the form of an elongated cylinder, wherein the coupling element is in the form of a cylinder segment substantially coaxial with the elongated cylinder. The cylinder segment may extend along the elongate cylinder. In some instances, the cylinder segment may extend along the elongate cylinder substantially along the entire length of the cylinder. In some embodiments, the main unit may be formed in the shape of an LED tube, for example according to T5 or T5 standard with a cylindrical housing wall made of glass or plastic. Based on the design of the coupling element, an extension unit may be mounted at various locations along the cylindrical housing wall of the LED tube.

Due to the coaxial design of the coupling element, a high conformity of the coupling element to the cylindrical housing wall may be achieved, such that the coupling element can lie tightly against the inside of the housing wall, which may strengthen the wireless coupling between the main unit and the extension unit.

The coupling element may be designed for wireless power transmission or power supply of the extension unit. Due to the wireless power supply of the extension unit, the extension unit does not require a separate power supply, which may simplify the retrofitting of the main unit or the installation of the extension unit.

The coupling element may be designed for wireless signal transmission between the main unit and the extension unit. The main unit may be designed to receive control signals via the coupling element to control the driver electronics in order to change the operating state of the main unit. The main unit may be configured to receive control signals from an extension unit to switch on or off and/or dim the main unit. In some embodiments, the main unit may be controlled by an extension unit such that the colour or colour temperature of the light or white light produced by the main unit may be influenced or changed.

In some embodiments, the coupling element may be configured for bi-directional signal transmission such that control signals may be sent in both directions between the main unit and the extension unit via the wireless coupling interface. Feedback signals representing the current operating state of the main unit may be received at the extension unit such that the main unit may be controlled based on the current operating state of the main unit.

In some embodiments, the coupling element may be at least partially permeable, transparent and/or translucent. In some embodiments, the coupling element may include a light-permeable material made of glass or plastic. The extension unit may include an at least partially translucent substrate on which conductor tracks or coils and/or further electronic components of the extension unit may be formed. Due to the light-permeability of the coupling element, the appearance or the radiation characteristic of the main unit may be unaffected or only slightly or insignificantly affected by the attachment of the extension unit.

In some embodiments, the coupling element may include a flexible substrate. On the flexible substrate, conductor tracks may be formed by means of thin-film technology and/or thick-film technology. The flexible substrate may be well-suited for tightly attaching the coupling element to the inside of the housing wall, such as in a housing-conforming manner.

In some embodiments, the coupling element may have a structure (e.g., a flat structure) vapor-deposited or grown on the inside of the housing wall. The inside of the housing wall may thus serve as a substrate for the coupling element, which may simplify the overall construction of the main unit. In addition, a high conformity of the coupling element to the housing wall may be achieved such that the strength of the wireless coupling may be increased.

According to a second aspect of the present disclosure, an extension unit is provided for functionally extending, such as by retrofitting, a main unit of a lighting device according to the first aspect.

The extension unit may have a functional unit for providing a functional extension of the main unit and a counter-coupling element for forming a wireless communication interface to the coupling element of the main unit, such that the wireless coupling between the main unit and the extension unit may take place through the housing (e.g., through the partially light-permeable housing wall, of the main unit.

With the extension unit, the functionality of the main unit may be extended as required without having to open or destroy the housing of the main unit.

The counter-coupling element may be designed for wireless energy absorption or energy harvesting for the power supply of the extension unit. The extension unit may thus do without an additional or separate power supply such that the main unit may be easily retrofitted with the extension unit.

In some embodiments, the counter-coupling element may be configured for wireless signal transmission between the main unit and the extension unit. The counter-coupling element may be configured to send control signals from the extension unit, in particular from the functional unit or control element of the extension unit to the main unit, to change the operating state of the main unit. The extension unit may be configured to send control signals to the main unit such that the main unit may be switched on or off and/or dimmed. In some embodiments, the main unit may be controlled by an extension unit such that the color or color temperature of the light or white light produced by the main unit may be influenced or changed.

The extension unit may include a sensor system for providing at least one sensor signal. The at least one signal provided by the sensor system may be used to control the main unit through the wireless coupling interface. The sensor system may include a passive infrared sensor (PIR) for detecting a movement and/or a daylight sensor for detecting a current daylight level, a temperature sensor, a dust sensor, a gas sensor, and/or further sensors. The functional unit may be designed to control the main unit based on detected movements or on the current daylight level and/or on further sensor data. Due to the selectability of the coupling point of the extension unit, the position of the extension unit may also be selected in such a way that the functionality of the sensor system may not be impaired or may be only slightly impaired, for example by shadowing effects.

In some embodiments, the functional unit may include a communication interface for wireless communication. The communication interface may be designed in such a way that the functional unit of the extension unit may be controlled wirelessly by an external control device according to a standard protocol, for example WiFi®, Bluetooth® and/or Zigbee®. The lighting device with extended functionality may thus be controlled remotely via the communication interface of the extension unit with a remote control or with a mobile control device, such as a smartphone or tablet with appropriate application software.

In some embodiments, the extension unit may have an at least partially light-permeable, transparent or translucent housing. The light-permeability of the extension unit may have the particular effect that the extension unit does not impair or only slightly impairs the appearance or the radiation characteristic of the main unit.

In some embodiments, the extension unit may have a housing that is at least partially or at least regionally light-permeable in the infrared spectral range (i.e., transparent or translucent). The light-permeability of the extension unit in the infrared spectral range may have the effect that sensors operating in the infrared spectral range, for example PIR sensors, may be accommodated within the housing of the extension unit.

In some embodiments, the housing of the extension unit may have one or more sensor openings configured to receive or hermetically seal one or more sensors (e.g., gas sensors) such that the extension unit may be sealed off from the environment.

According to a further aspect of the present disclosure, a lighting device with extended functionality is provided. The lighting device may include a main unit according to the first aspect and an extension unit according to the second aspect, wherein the main unit and the extension unit may be wirelessly coupled to each other via the coupling element of the main unit and via the counter-coupling element of the extension unit through the partially light-permeable housing wall of the main unit.

In addition to the functions of the main unit or basic functions, the lighting device may have further functionality that may be provided by the extension unit depending on the design.

In some embodiments, the lighting device may include a fastening device or fastening elements for fastening the extension unit to the main unit. The fastening device may include magnetic and/or mechanical fastening elements. The fastening elements may be designed as part of the extension unit or main unit or as separate parts. The fastening elements may be designed to provide an easily detachable mechanical connection between the main unit and the extension unit. The mechanical fastening elements may further be designed to change the position of the extension unit with respect to the main unit without loosening the mechanical connection between the main unit and the extension unit. In the case of an elongated main unit (e.g., in the form of an LED tube), the fastening device may include a slider which may be placed on the LED tube in a form-fitting manner, and may be displaced along the LED tube, to which the extension unit may be fastened. In this way, the position of the extension unit may be easily adjusted as required.

BRIEF DESCRIPTION OF THE DRAWINGS

The present disclosure is now explained in more detail with the aid of the attached figures. The same reference numbers are used in the figures for identical or similarly acting parts.

DETAILED DESCRIPTION OF THE DRAWINGS

Figure 1:
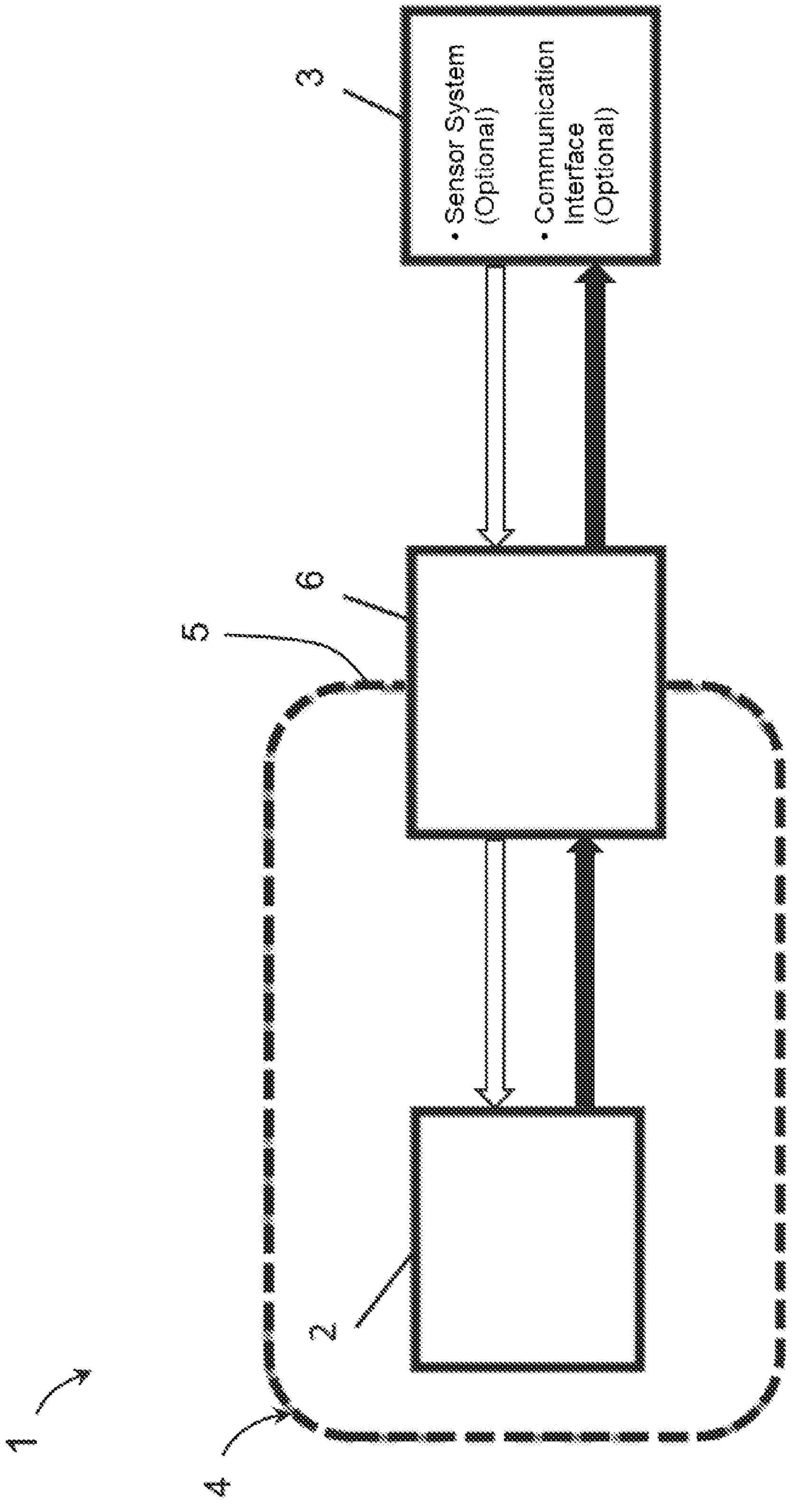
FIG. 1 shows a schematic block diagram of a lighting device with extended functionality according to an embodiment of the present disclosure.

FIG. 1 shows a schematic block diagram of a lighting device with extended functionality according to an embodiment of the present disclosure. The lighting device 1 with extended functionality may include a main unit 2 with extendable functionality and an extension unit 3 for extending the functionality of the main unit 2. The main unit 2 may have a housing 4 with a housing wall 5, wherein the main unit 2 and the extension unit 3 may be wirelessly electrically coupled to each other through the housing wall 5 via a wireless coupling interface 6. The main unit 2 of the lighting device 1 may further include electrical connections (not shown) for supplying power to the main unit 2.

The wireless coupling interface 6 may be designed to transmit electrical energy from the main unit 2 to the extension unit 3 for power supply of the extension unit 3 wirelessly or cable-free. The energy transmission via the coupling interface 6 is symbolically represented by the black arrows in FIG. 1. The extension unit 3 may be designed as a sensor and/or control unit which may be attached to the housing 4 from the outside and may be supplied with electrical energy by the main unit 2 via the wireless interface 6.

The wireless coupling interface 6 may further be adapted to transmit electrical signals from the extension unit 3 to the main unit 2 and/or from the main unit 2 to the extension unit 3. The extension unit 3 may include a controller and a memory for storing data and machine-readable instructions for the controller. The signal transmission via the coupling interface 6 is symbolically represented by white arrows in FIG. 1.

The wireless coupling interface 6 may be designed to electrically couple the main unit 2 and the extension unit 3 to each other by inductive and/or capacitive coupling, wherein the type of coupling and the geometry of the wireless coupling interface 6 may depend on the specific application.

Figure 2:
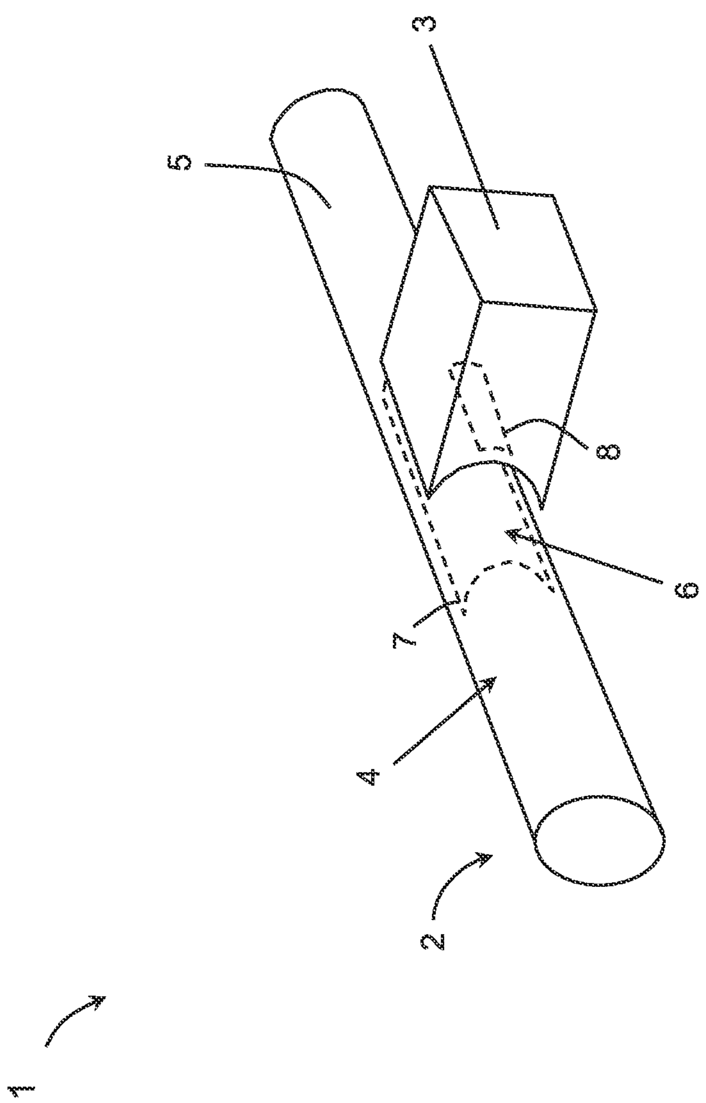
FIG. 2 shows a lighting device with extended functionality according to an embodiment of the present disclosure.

FIG. 2 shows a lighting device with extended functionality according to an embodiment of the present disclosure. Similar to the embodiment example of FIG. 1, the lighting device 1 may include a main unit 2 and an extension unit 3, wherein the main unit 2 and the extension unit 3 may be wirelessly electrically coupled to each other via the wireless coupling interface 6.

In the embodiment of FIG. 2, the lighting device 1 may be in the form of an LED tube, which may have an elongated housing 4 with a substantially cylindrical light-permeable housing wall 5. Within the housing 4, an LED light source (not shown) may be arranged together with driver electronics (not shown) for driving the light source.

A coupling element 7 may be formed on the inside of the housing 4 to form the wireless coupling interface 6 of the main unit 2 with the extension unit 3. The coupling element 7 may be elongated and extend over a length of the LED tube which is larger than the dimensions of the extension unit 3.

FIG. 2 also shows a counter-coupling element 8 of the extension unit 3 for forming the wireless coupling interface 6 to the main unit 2 by means of the coupling element 7 of the main unit 2.

The lighting device 1 may further include fastening elements (not shown) for fastening the main unit 2 to the extension unit 3. The fastening elements may include magnetic and/or mechanical fastening elements and may be designed such that the extension unit 3 is freely displaceable along the housing wall 5 of the main unit 2. This allows the extension unit 3 to be freely positioned along this length section in accordance with the application.

The coupling element 7 or the counter-coupling element 8 may include inductive and/or capacitive coupling elements. These coupling types may be used for both energy and signal transmission. Depending on the choice of the coupling type, different constraints may arise with respect to the geometry and required accuracy of the positioning of the extension unit 3 with respect to the main unit 2 alignment. The type of coupling may be selected depending on the respective application.

The main unit 2 may be designed to receive control signals sent by the extension unit 3 via the coupling element 7 for controlling the driver electronics in order to change the operating state of the main unit 2. The main unit 2 may be configured to receive control signals from the extension unit 3 to switch on or off and/or dim the main unit 2. In some embodiments, the main unit 2 may be controlled by an expansion unit 3 such that the color or color temperature of the light or white light produced by the main unit may be influenced or changed.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products may also be connected with each other in order to obtain further functions.

The invention claimed is:

1. A coupling element configured to be disposed inside a lighting device and to form through a housing wall of the lighting device a wireless coupling interface to an extension unit external to the lighting device, said extension unit being configured for extending functionality of the lighting device beyond a basic lighting functionality to include at least one of controller interfacing and sensor interfacing.

2. The coupling element of claim 1, wherein in being configured to form the wireless coupling interface to the extension unit, the coupling element is configured to provide wireless power transmission to the extension unit through the housing wall of the lighting device.

3. The coupling element of claim 1, wherein in being configured to form the wireless coupling interface to the extension unit, the coupling element is configured to provide wireless signal communication through the housing wall of the lighting device.

4. The coupling element of claim 3, wherein the wireless signal communication is bi-directional.

5. The coupling element of claim 3, wherein the wireless signal communication through the housing wall of the lighting device is through a portion of the housing wall which is at least partially light-permeable.

6. The coupling element of claim 5, wherein the portion of the housing wall is light-permeable in an infrared spectral range.

7. The coupling element of claim 3, wherein the wireless signal communication includes at least one of transmission and reception of a control signal which changes an operating state of the lighting device.

8. The coupling element of claim 7, wherein the change in operating state comprises at least one of:

switching on or off the lighting device;

dimming the lighting device;

changing a color of light produced by the lighting device; and changing a color temperature of light produced by the lighting device.

9. The coupling element of claim 1, wherein in being configured to form the wireless coupling interface to the extension unit, the coupling element is configured to provide both wireless power transmission and wireless signal communication through the housing wall of the lighting device.

10. The coupling element of claim 1, wherein the coupling element is configured such that the wireless coupling interface is formable through the housing wall of the lighting device at different housing locations along the lighting device.

11. The coupling element of claim 1, wherein the coupling element is shaped to substantially conform to the housing wall of the lighting device.

12. The coupling element of claim 11, wherein the housing wall is curved.

13. The lighting device comprising the coupling element of claim 1.

14. The lighting device of claim 13, wherein the lighting device is a light-emitting diode (LED) tube lamp.

15. A luminaire comprising the lighting device of claim 13.

16. A lighting system comprising:

the lighting device of claim 13; and the extension unit.

17. The lighting system of claim 16, wherein the extension unit comprises a counter-coupling element configured for forming the wireless coupling interface to the coupling element.

18. The lighting system of claim 17, wherein the counter-coupling element comprises an infrared sensor.

19. The lighting system of claim 18, wherein the extension unit is at least partially light-permeable in an infrared spectral range.

20. The lighting system of claim 16, wherein the extension unit comprises a sensor system configured for providing at least one sensor signal.

21. The lighting system of claim 20, wherein the sensor system comprises at least one of an infrared sensor, a daylight sensor, a temperature sensor, a dust sensor, and a gas sensor.

22. The lighting system of claim 16, wherein the extension unit is configured to be wirelessly controlled via a control device external to both the lighting device and the extension unit.

* * * * *